United States Patent

Certeza

[11] Patent Number: 5,845,536
[45] Date of Patent: Dec. 8, 1998

[54] TRANSMISSION SHIFT CONTROL MECHANISM

[75] Inventor: Cesar Flores Certeza, Sterling Heights, Mich.

[73] Assignee: Saturn Corporation, Troy, Mich.

[21] Appl. No.: 821,837

[22] Filed: Mar. 21, 1997

[51] Int. Cl.[6] .................................................. B60K 20/04
[52] U.S. Cl. .................................. 74/473.26; 74/473.27; 74/473.35; 74/97.1; 74/473.15
[58] Field of Search .......................... 74/473.27, 473.34, 74/473.35, 97.1, 473.15, 517, 473.21, 473.24, 473.25, 473.26, 473.38

[56] References Cited

U.S. PATENT DOCUMENTS

| | | | |
|---|---|---|---|
| 4,143,560 | 3/1979 | Kinkade | 74/473.15 X |
| 4,245,521 | 1/1981 | Osborn | 74/473.15 |
| 4,583,417 | 4/1986 | Hurlow | 74/473.15 |
| 4,726,249 | 2/1988 | Inuzaka et al. | 74/473.34 |
| 4,756,205 | 7/1988 | Dickinson | 74/473.33 |
| 4,879,922 | 11/1989 | Suzuki | 74/473.33 |
| 5,287,743 | 2/1994 | Doolittle et al. | 74/500.5 X |

*Primary Examiner*—Richard M. Lorence
*Assistant Examiner*—Ankur Parekh
*Attorney, Agent, or Firm*—Donald F. Scherer

[57] ABSTRACT

A shift control mechanism has a shift tower including a mounting bracket on which a shift lever is mounted to permit fore-aft pivotal movement and transverse pivotal movement. Fore-aft movements provide a ratio selection and transverse movements provide a gate or range selection. An assist plate is pivotally mounted on the bracket to be driven by the shift lever during the fore-aft movement. The assist plate cooperates with the mounting bracket through a spring to provide a force directed to assist in the completion of the shift movement. A detent mechanism is incorporated in the shift tower between the assist plate and the bracket to provide shift feel in feedback to the operator, especially in the neutral condition.

11 Claims, 5 Drawing Sheets

TRANSMISSION SHIFT CONTROL MECHANISM

TECHNICAL FIELD

This invention relates to transmission shift control mechanisms.

BACKGROUND OF THE INVENTION

Many manually shifted multi-speed transmissions have a floor mounted shift tower with a pivotally supported manual lever. The manual lever is manipulated by the operator to select the gear ratio desired.

Generally, fore-aft pivotal movement (relative to the longitudinal axis of the vehicle) will select between two gear ratios, for example, first or second ratio, while transverse pivotal movement select between gates or ranges, for example, 1-2, 3-4 or 5-R. The connection between the manual lever and the transmission ratio establishing mechanism; i.e., synchronizers, is provided by flexible cable mechanisms.

The transmission has internal mechanisms, including springs and detent devices, which respond to movement of the cable mechanisms for providing shift feel or operator feedback. The efficiency of the cable mechanism affects the level of feedback to the operator. The effect of cable efficiency can vary between systems or installations of the same type system. This can result in the operator inputting less force than needed when a sense of shift completion is not fully recognized by the feedback the operator receives.

SUMMARY OF THE INVENTION

It is an object of the present invention to provide an improved manual shift control mechanism.

In one aspect of the invention, a shift lever is mounted on a bracket for pivotal movement in fore-aft and transverse orthogonal planes. In the fore-aft plane, the lever also pivots or drives an assist plate, while in the transverse plane the assist plate remains stationary. A spring is connected between the assist plate and the bracket, such that a feedback force is communicated through the lever in the fore-aft plane.

In another aspect of the invention, the force resulting from the spring is in a direction to help the operator complete the shift and is only present when the shift lever is moved from a neutral position toward a gear selection position.

In a further aspect of the invention, a detent mechanism is disposed between the bracket and the assist plate to provide a neutral position indicator for the operator and the resultant force on the lever from the spring is zero in neutral.

DESCRIPTION OF AN EXEMPLARY EMBODIMENT

Figure 1:
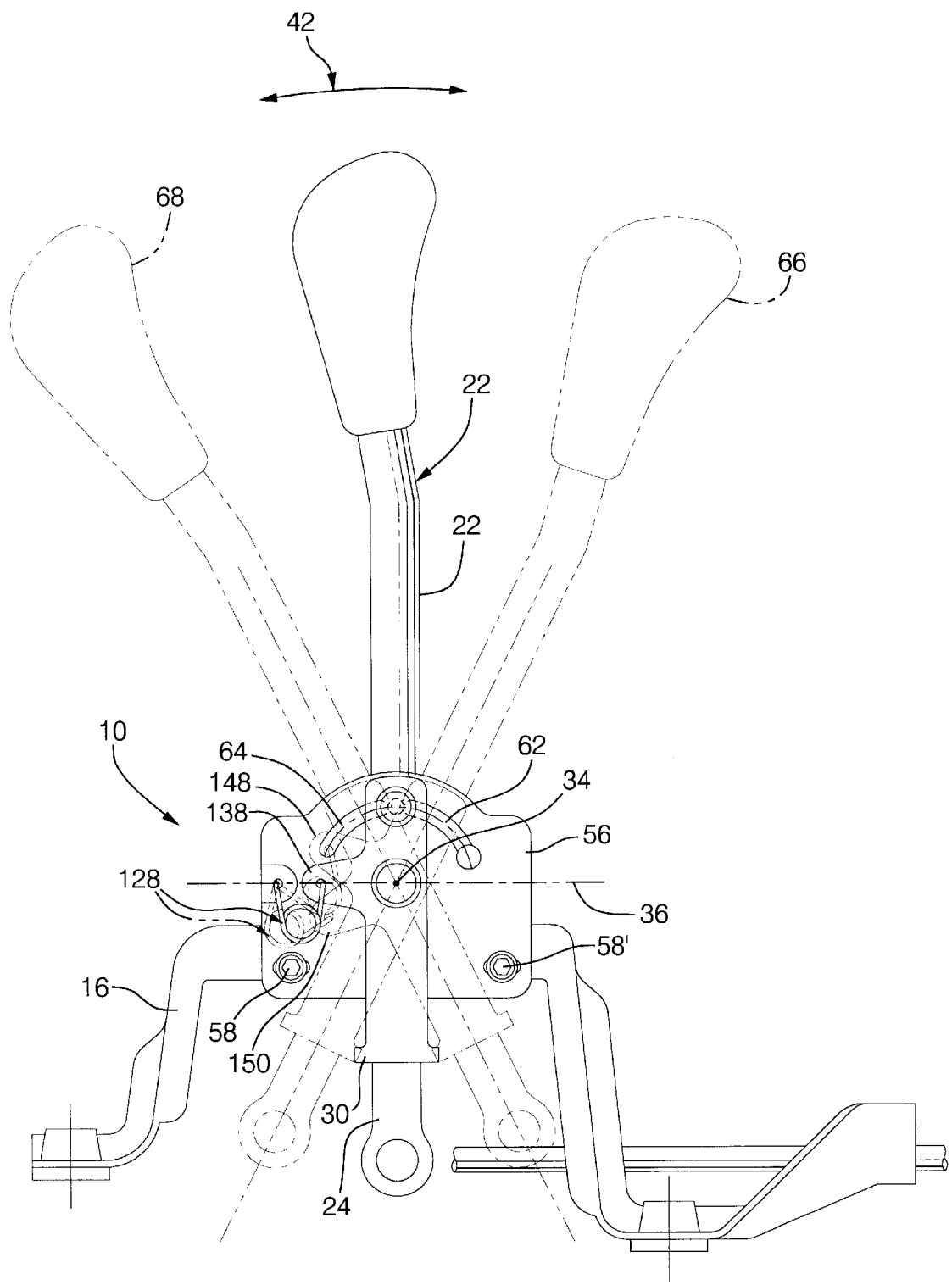
FIG. 1 is a side elevational view of a shift tower incorporating the present invention.
Figure 2:
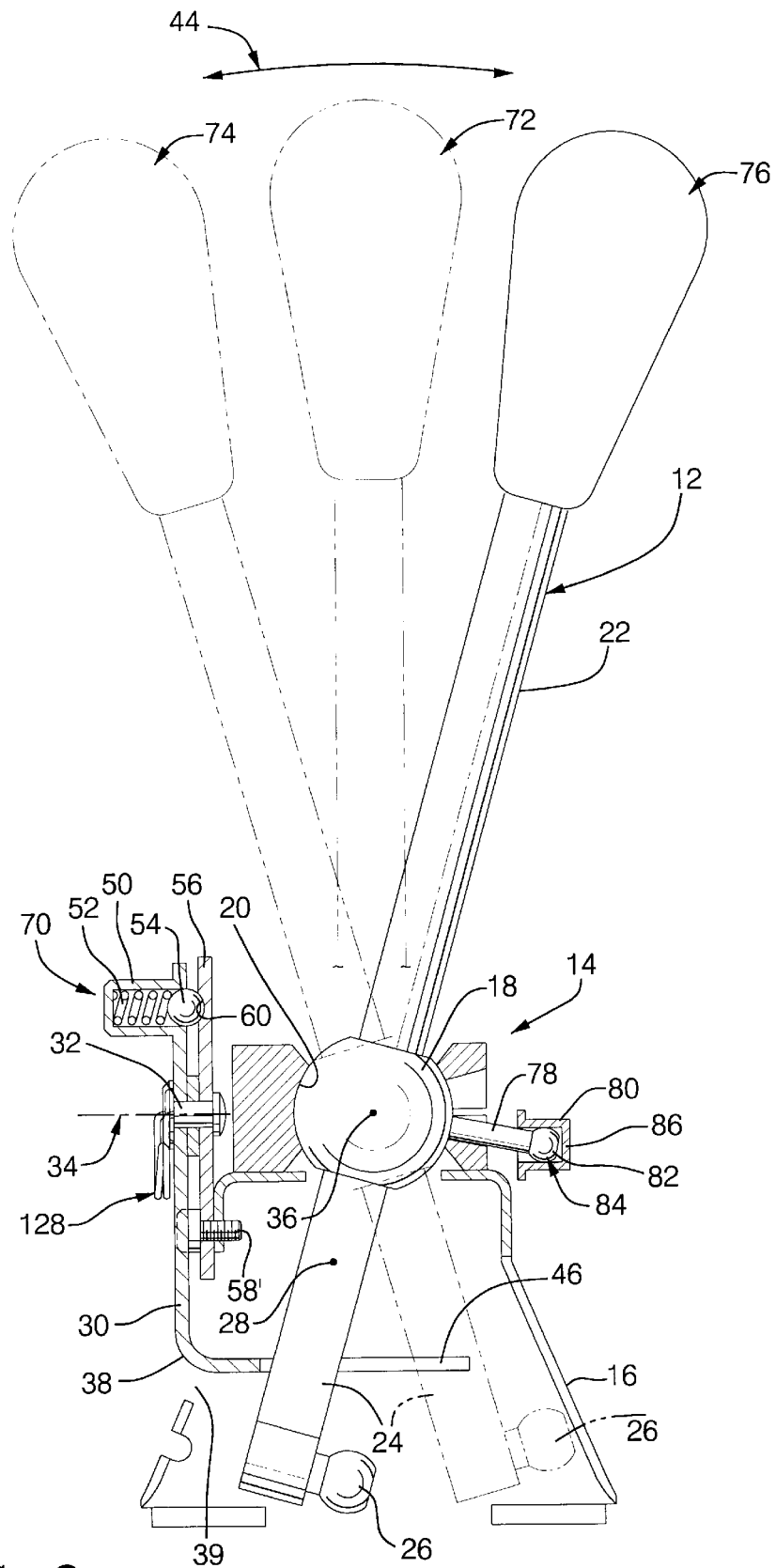
FIG. 2 is a front elevational view partly in section of the shift tower shown in FIG. 1.

Referring to the drawings, there is seen particularly in FIGS. 1 and 2, a transmission shift tower 10 which includes a manual shift lever 12 pivotally mounted in a ball and socket 14 on a mounting bracket 16. The ball and socket 14 includes a stirrup or ball portion 18 formed on the shift lever 12 and a socket or bearing 20 secured with the bracket 16. The shift lever 12 has a rod portion 22 extending upward from the ball 18 and a lower portion 24 extending from the ball portion 18. The lower portion 24 includes a cable attachment stud 26 adapted to connect with a conventional flexible cable mechanism commonly used in manual transmission shift controls.

The lower portion 24 of the shift lever 12 is shown as a solid member. However, it is well known that a pivot point might be placed below the ball 18 approximately at point 28. This will permit the lower portion 24 of the shift lever to remain substantially vertical throughout the transverse shifting of the lever 12.

The tower 10 further includes an assist plate 30 which is pivotally mounted by a rivet 32 on a fore-aft pivot axis 34 of the manual shift lever 12. Intersecting the fore-aft axis 34, which might also be termed the selection axis, is a transverse shift axis or range selection axis 36. The transverse axis 36 is orthogonally disposed relative to the fore-aft pivot axis 34.

Figure 7:
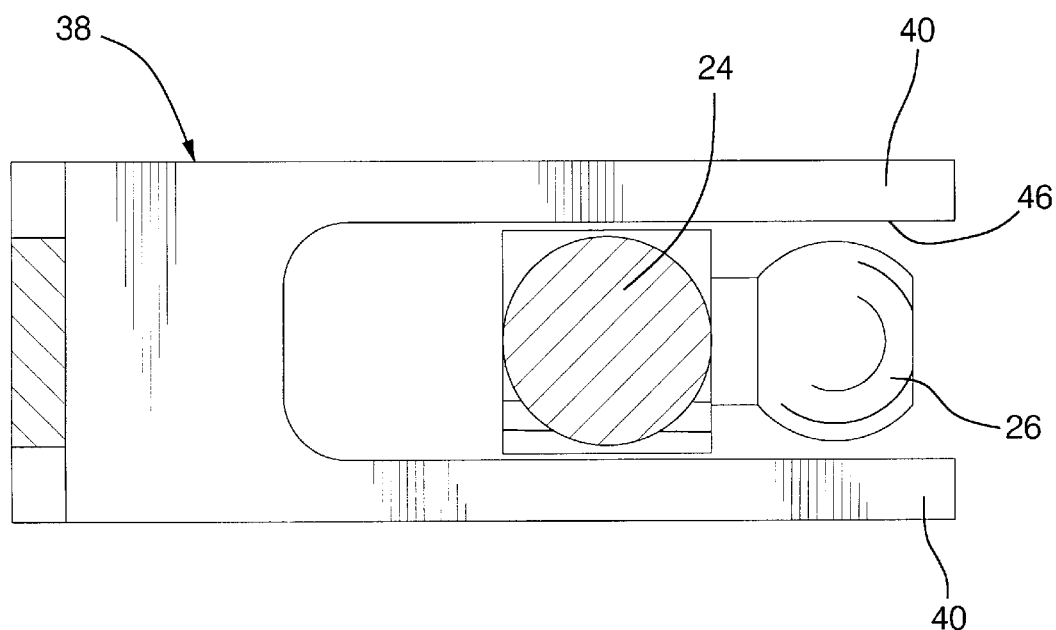
FIG. 7 is a view taken along line 7—7 in FIG. 4.

The assist plate 30 has a lower bifurcated portion 38 which extends through an opening 39 in the bracket 16 and inwardly under the ball and socket 14. As seen in FIG. 7, the bifurcated portion 38 has two legs 40 which are disposed on opposite sides of the lower portion 24 of the shift lever 12. Thus, the shift lever, when moved in a fore-aft pivotal motion, as depicted by Arrow 42, will carry with it the assist plate 30. However, due to the bifurcated portion 38, movement of the shift lever 12 in a transverse pivotal direction, as indicated by the Arrow 44, the assist plate 30 will remain stationary. During pivotal movement in the transverse direction 44, the lower portion 24 is free to move transversely of the vehicle in a slot 46 which is formed between the opposite legs 40.

The assist plate 30 has a pocket or recess portion 50 in which is disposed a spring 52 and a ball 54. The ball 54 is urged toward a bracket 56 which is secured through fasteners 58, 58' with the mounting bracket 16. The ball 54 is urged by the spring 52 into a depression or socket 60. The bracket 56 also has formed therein a pair of grooves 62 and 64 which are aligned with the movement of the ball 54 during fore-aft movement 42 of the shift lever 12.

The depression 60 is not directly connected with the grooves 62 and 64 such that the ball 54 must depress the spring 52 when moving from the depression 60 to either of the grooves 62 or 64. Thus, when the shift lever 12 is in the neutral position shown in solid lines in FIG. 1, a force is required to provide a shift from that neutral position to the 1-3-5 position shown at 66 or the 2-4-R position shown at 68. Thus, a detent mechanism 70 comprised of the spring 52, the ball 54 and the depression 60 provides a neutral position feel or feedback to the operator of the shift lever 12. This force is not felt during movement in the transverse direction 44. Since during this movement, the assist plate does not pivot relative to the bracket 56. Thus, the shift lever 12 is movable freely from the 3-4 neutral position shown at 72 to either the 1-2 neutral position shown at 74 or the 5-R neutral position shown in solid lines at 76.

Movement in the transverse direction 44, as previously suggested, is movement transverse to the longitudinal axis of the vehicle and is generally utilized to provide range selections. That is, in the position 72, the 3-4 range is selected such that in that position, movement of the shift lever in the fore-aft direction 42 shown in FIG. 1, will result in third gear position 66 or fourth gear position 68. The same type of arrangement will occur if the lever is first moved to the 1-2 neutral position 74 and then fore-aft positions 66 or 68 to select gear ratios one or two, respectively. A same type of motion will permit the selection of fifth gear or reverse. Thus, the fore-aft direction 42 is the gear selection pivotal motion while the transverse direction 44 is the range selection pivotal motion.

The ball 18 has secured therewith a post 78 which has formed thereon a ball 80. The ball 80 fits in a socket 82 to provide a ball and socket bearing arrangement 84. The ball and socket bearing arrangement is operable to establish movement of a bellcrank 86 which is better seen in FIG. 5. The ball and socket bearing arrangement 84 is secured to one leg 88 of the bellcrank 86 which is pivotally mounted on a pivot pin 90.

Another leg 92 of the bellcrank 86 has formed thereon a cable attachment post 94 to which a gear range cable 96 is connected. The gear range cable 96 is a conventional push/pull type flexible transmitter commonly utilized in the control of manual transmissions. The cable 96 has a sheath 98 secured by a fitting 100 to the bracket 16.

The other end of the sheath 98 is secured by a fitting 102 to a transmission housing, not shown. A core 104 of the cable 96 is secured between the post 94 and a bellcrank 106 which is pivotally mounted on an axis 108 on the transmission housing. The cable 96 enforces pivoting of the bellcrank 106 such that a shift control spool 110 is moved linearly relative to a transmission gear selector assembly 112 which is secured to the transmission housing.

The transmission gear selector 112 may be constructed in accordance with the transmission gear selector shown in U.S. Pat. No. 5,492,209 issued to Certeza Feb. 20, 1996, or U.S. Pat. No. 5,560,254 issued to Certeza Oct. 1, 1996. Other conventional gear selector mechanisms can be utilized.

A gear select cable 114 is connected between the cable attachment 26 and a lever 116 attached to the control 110. Movement of the cable 114 controls pivoting of the control 110 within the transmission gear selector assembly 112. The cables 96 and 114 are conventional flexible motion transmitting mechanisms, the construction of which is well known to those skilled in the controls art.

Figure 5:
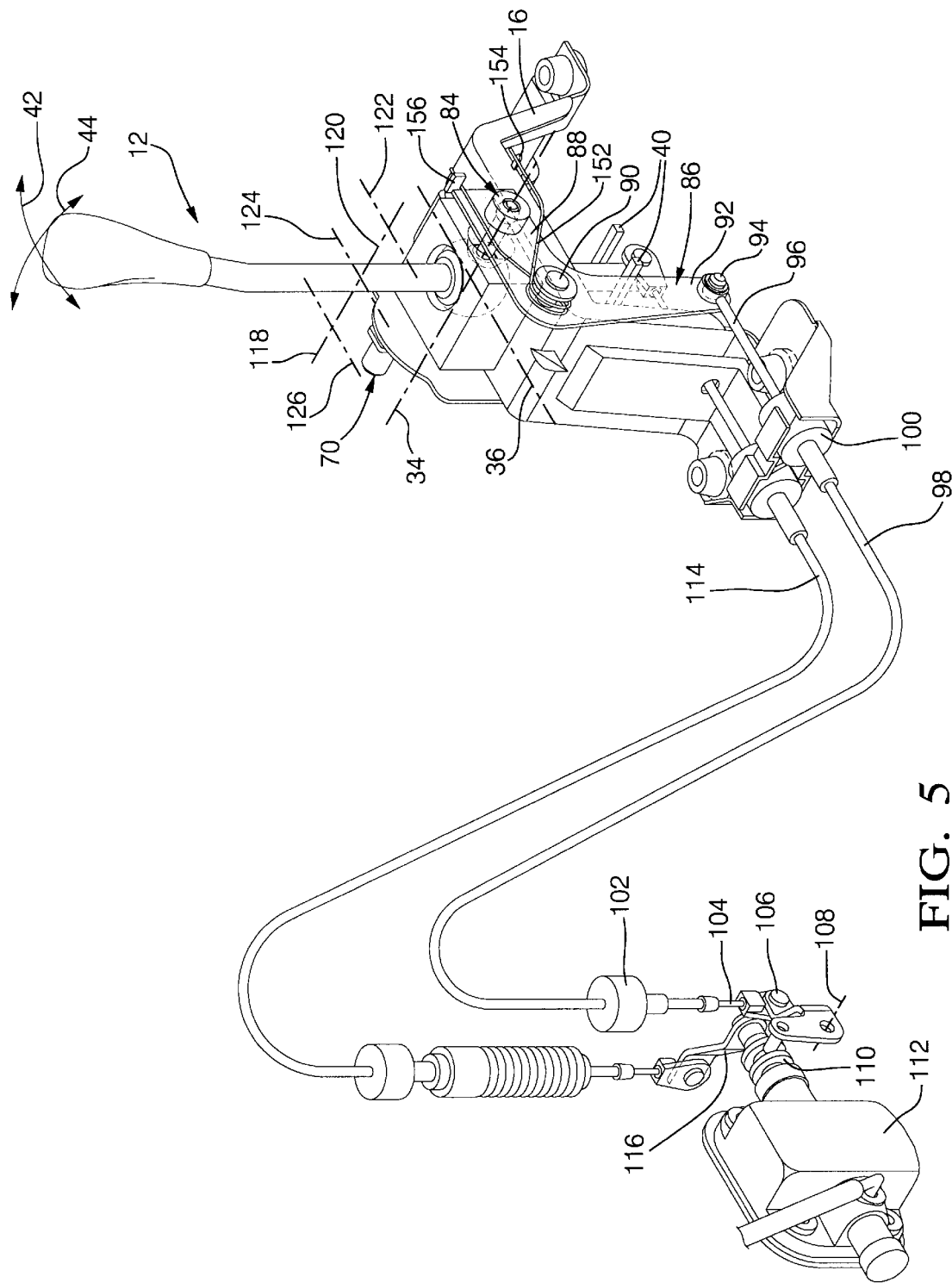
FIG. 5 is an isometric view of a transmission shift control mechanism utilizing a shift tower shown in FIG. 1.

As is well known, the combined movement caused by the cable 96 and the cable 114 can result in the well known H-pattern shown in phantom lines at 118 and superimposed on the shift lever 12 in FIG. 5. The transverse pivoting of the shift lever 12 results in the shift lever 12 being moved along a neutral path 120 and also pivoting of the bellcrank 86. Thus, the linear motion of the control 110 responds to the transverse movement of the shift lever 12.

Fore-aft motion of the shift lever 12 occurs along the 1-2 path 122, the 3-4 path 124, or the 5-reverse path 126. Movement in the longitudinal or fore-aft direction along any of the paths 122, 124 or 126 results in pivoting of the lever 116 through the cable 114 thereby permitting a conventional finger selector within the transmission gear selector assembly 112 to cause conventional forks to enforce engagement of a synchronizer to establish the desired ratio.

Figure 3:
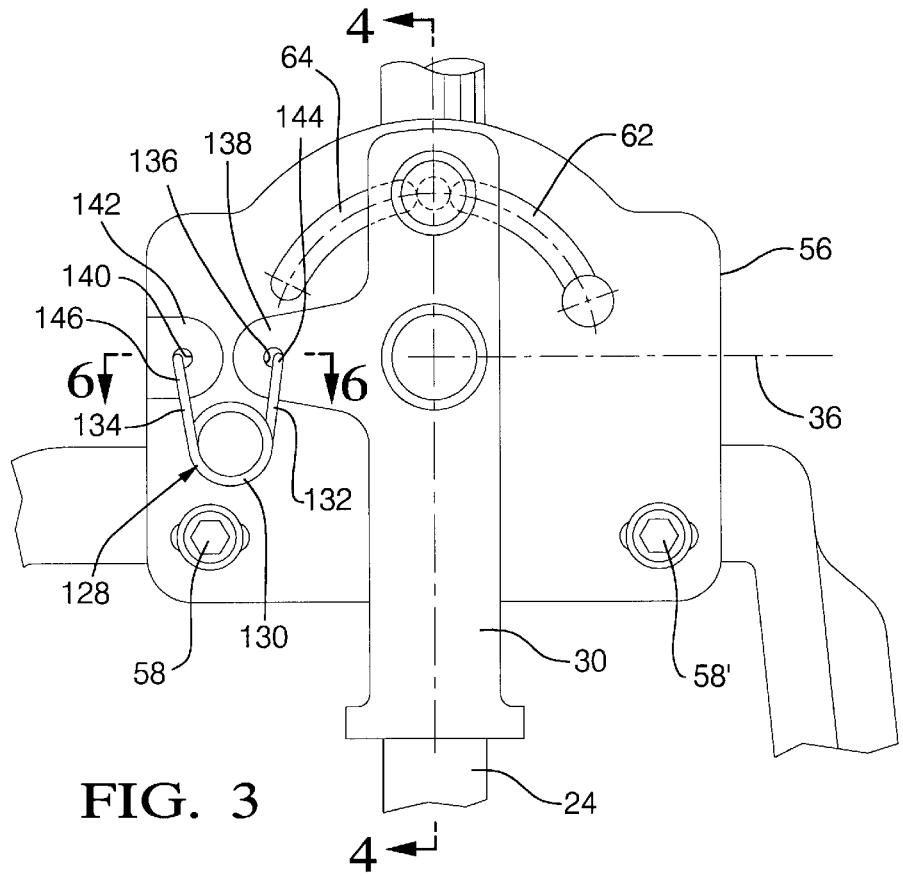
FIG. 3 is an enlarged view of a portion of the shift tower shown in FIG. 1.
Figure 4:
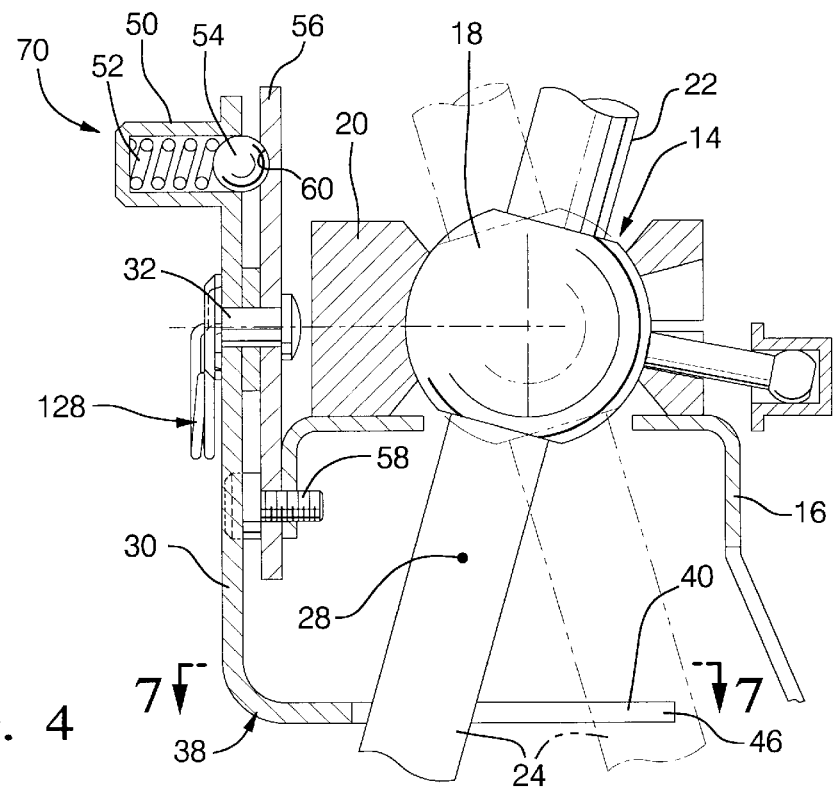
FIG. 4 is a view taken along line 4—4 in FIG. 3.
Figure 6:
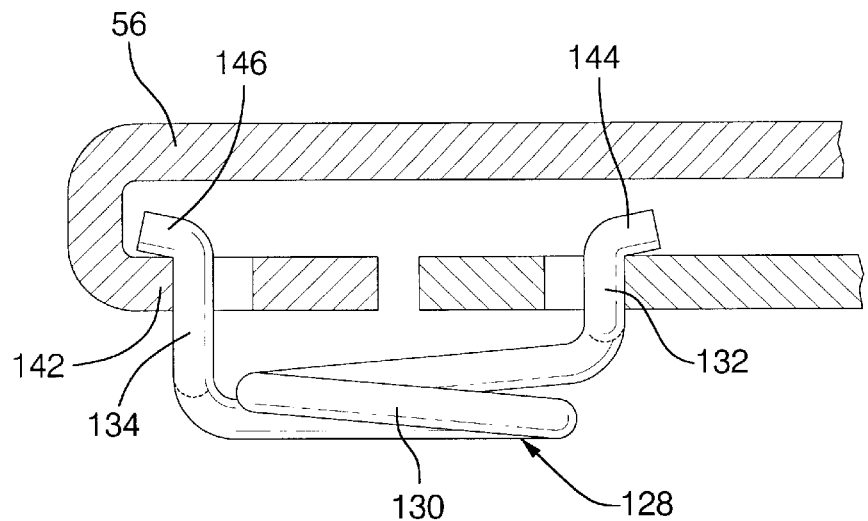
FIG. 6 is a view taken along line 6—6 in FIG. 3.

In FIGS. 1, 3 and 6, there is seen an assist spring 128 which has a coil portion 130 and legs 132 and 134. The leg 132 is positioned in an aperture 136 formed on an ear or extension 138 of the assist plate 30. The leg 134 is disposed or positioned in an aperture 140 formed in an extension 142 which is integral with the bracket 56. The spring 128 is effective to provide a force between the assist plate 30 and the bracket 56 whenever the assist plate 30 is moved off or away from the neutral position shown in FIG. 3. It should be noted in FIG. 3 that the two legs 132 and 134 are aligned at their respective ends 144 and 146 with the transverse axis 36 of the shift lever 12. Therefore, transverse motion of the shift lever 12 will not affect the positioning of the spring 128. However, this should be evident from the fact that the transverse motion does not affect movement of the assist plate at all because of the bifurcated portion 38.

However, fore-aft motion will result in the extension 138 being moved either above the axis 36 as shown at 148 in FIG. 1, or below the axis 36 as shown at 150 in FIG. 1. When the shift lever 12 is moved to the position shown at 66, the force on the legs 132 and 134 are transmitted such that the spring attempts to expand thereby putting a force on the shift lever 12 in a direction to continue the movement for the position 66. Thus, when the operator moves the lever in the forward position, the detent mechanism 70 is released in a neutral position and the spring 128 assists the operator in movement toward the first, third or fifth gear selection position.

When the shift lever 12 is moved toward the position 68, the resultant force from the spring 128 is in a direction to again continue motion in the aft direction toward the second, fourth or reverse gear selection position. Thus, no matter which direction from neutral the operator selects, there is an assist force to urge the shift lever 12 to continue in the direction selected by the operator. This assist force will help in overcoming some of the inefficiencies which can be found in the cables 96 and 114. Also, this assist motion or force is provided with a single spring which has a zero resultant force assist in the neutral position.

The detent action provided by detent 70 and the assist spring 128 are directly felt by the operator which provides for a more firm feel on the shift lever 12. One other operator feedback mechanism is provided, and that is, a torsion spring 152 that is provided between a rest 154 formed on the bracket 16 and an extension 156 formed on the bellcrank 86. When the shift lever 12 is moved in the transverse direction 44 toward the 1-2 path 122, the force in the torsion spring 152 resists that motion such that the operator will recognize a movement from the 3-4 path to the 1-2 path.

Restrictions or resistances to movement into the 5-reverse path are provided in a conventional manner within the transmission. Coming out of either the 1-2 or the 5-reverse positions, the gear shift lever 12 is assisted back toward the neutral position of the 3-4 path.

Therefore, it will be appreciated by those skilled in the art that the system incorporated in the transmission control mechanism disclosed provides operator feedback to the shift lever 12 in a number of structures. The assist spring, in particular, provides an operator feedback and assist force which urges the operator to complete the shift in a given direction after the operator has started that shift. The detent mechanism 70 informs the operator of a fore-aft movement from the neutral position. The spring 152 informs the operator that movement from the 3-4 path to the 1-2 path is about to occur. These feedback and assist forces are operated directly on the shift lever 12, such that the efficiency of the cable 98, 96 or 114 does not interfere or otherwise detract from the operator feedback and assist forces.

I claim:

1. A shift control tower for a manual transmission comprising:

a stationary mounting bracket;

a shift lever pivotally mounted in said bracket for selection pivotal movement from a neutral position to a plurality of ratio positions and for range pivotal movement along a path in the neutral position;

a flexible motion transmitter connected between said shift lever and a transmission shift controller for movement during said selection pivotal movement;

an assist plate pivotally mounted on said mounting bracket and operatively connected with said shift lever for conjoint movement therewith during said selection pivotal movement and being stationary relative to said shift lever during range pivotal movement of said shift Lever; and an assist spring directly connected to both said assist plate and said mounting bracket for applying a continuous bias force on said assist plate toward the neutral position when said shift lever is moved from the neutral position during selection pivotal movement.

2. The shift control tower for a manual transmission defined in claim 1 further comprising:

means for indicating to an operator that said shift lever is in the neutral position.

3. The shift control tower defined in claim 1 wherein said shift lever has a lower portion disposed below a selection pivot axis of said shift lever and said assist plate includes a pivot axis substantially coaxial with said selection pivot axis and a bifurcated transversely extending portion disposed adjacent said lower portion of said shift lever.

4. The shift control tower defined in claim 3 wherein said assist spring has a first leg with a connection point on said mounting bracket and a second leg has a connection point on said assist plate and wherein said first and second connection points are substantially aligned with said selection pivot axis.

5. A shift control tower for a manual transmission comprising:

a mount bracket;

a shift lever pivotally mounted in said bracket for fore-aft pivotal movement and for transverse pivotal movement;

a first flexible motion transmitter operatively connected to transmit motion between said shift lever and a transmission shift controller during fore-aft pivotal movement;

an assist plate pivotally mounted on said bracket and operatively connected with said shift lever for conjoint movement therewith during said fore-aft movement of said shift lever;

an assist spring directly connected to both said assist plate and said mounting bracket for applying a biasing force to said assist plate toward a neutral position when said shift lever is pivoted during fore or aft pivotal movement; and a detent mechanism disposed between said assist plate and said mounting bracket providing a position indicator for an operator.

6. The shift control tower defined in claim 5 wherein said detent mechanism is effective to provide position indication during fore-aft movement in a neutral position only.

7. The shift control tower defined in claim 5 further comprising a second flexible motion transmitter operatively connected to transmit motion between said shift lever and a transmission shift controller during transverse pivotal movement; and wherein said detent mechanism is effective to provide position indication during fore-aft movement only.

8. The shift control tower defined in claim 5 wherein said shift lever has a lower portion disposed below a fore-aft pivot axis of said shift lever and said assist plate includes a pivot axis substantially coaxial with said fore-aft pivot axis and a bifurcated transversely extending portion disposed adjacent said lower portion of said shift lever for contact therewith.

9. The shift control tower defined in claim 8 wherein said assist spring has a first leg with a connection point on said mounting bracket and a second leg has a connection point on said assist plate and wherein said first and second connection points are substantially aligned with said fore-aft pivot axis when said shift lever is in a neutral position.

10. The shift control tower defined in claim 9 wherein said assist spring applies a continuous force urging further movement when said shift lever is pivoted on the fore-aft axis from the neutral position.

11. A shift control tower for a manual transmission comprising:

a mounting bracket;

a shift lever pivotally mounted in said bracket for fore-aft pivotal movement and for transverse pivotal movement;

a first flexible motion transmitter operatively connected to transmit motion between said shift lever and a transmission shift controller during fore-aft pivotal movement;

an assist plate operatively connected with said shift lever for conjoint movement therewith during said fore-aft movement;

an assist spring operatively connected between said assist plate and said mounting bracket for applying a biasing force to said assist plate when said shift lever is pivoted during fore or aft pivotal movement;

a detent mechanism disposed between said assist plate and said mounting bracket providing a position indicator for an operator;

said shift lever has a lower portion disposed below a fore-aft pivot axis of said shift lever and said assist plate includes a pivot axis substantially coaxial with said fore-aft pivot axis and a bifurcated transversely extending portion disposed adjacent said lower portion of said shift lever for contact therewith.

* * * * *